(12) United States Patent
Morelli

(10) Patent No.: US 6,535,525 B1
(45) Date of Patent: Mar. 18, 2003

(54) METHOD OF TRANSMITTING STREAMS OF VIDEO DATA, IN MULTI-LENGTH FRAMES, AT A SINGLE AVERAGE BIT RATE

(75) Inventor: John Vernon Morelli, Salt Lake City, UT (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/329,588

(22) Filed: Jun. 10, 1999

(51) Int. Cl.[7] .................................................. H04L 5/00
(52) U.S. Cl. ..................................... 370/474; 370/395.1
(58) Field of Search .................................. 370/351, 352, 370/353, 354, 355, 356, 390, 395.1, 395.6, 395.61, 395.62, 395.63, 395.64, 395.65, 470, 471, 472, 473, 474, 432, 542, 543, 544

(56) References Cited

U.S. PATENT DOCUMENTS

| | | | | |
|---|---|---|---|---|
| 5,228,028 A | * | 7/1993 | Cucchi et al. | 370/94.1 |
| 5,365,272 A | * | 11/1994 | Siracusa | 348/426 |
| 5,537,408 A | * | 7/1996 | Branstad et al. | 370/79 |
| 5,652,749 A | * | 7/1997 | Davenport et al. | 370/466 |
| 5,822,524 A | * | 10/1998 | Chen et al. | 395/200.33 |
| 6,292,487 B1 | * | 9/2001 | Kunito et al. | 370/395 |
| 2001/0055322 A1 | * | 12/2001 | Domon | 370/537 |

\* cited by examiner

*Primary Examiner*—Steven Nguyen
*Assistant Examiner*—Duc Duong
(74) *Attorney, Agent, or Firm*—Charles J. Fassbender; Mark T. Starr; Lise A. Rode

(57) ABSTRACT

Multiple streams of digital video data are partitioned into frames of at least two different lengths, where each frame length is an integer multiple times a minimum frame length. Each frame is written into a series of full cells and one or two partial cells. Each full cell carries the same number of video data bits, while each partial cell carries video data bits and/or other overhead bits which together equal the number of video data bits in one full cell. All of the full cells and partial cells for the frames are sent in a time-multiplexed fashion on a communication channel at a single cell rate. A constraint is imposed whereby the different frame lengths are limited to those where the integer multiple of the minimum frame length, divided by the total number of full and partial cells per frame, is a single ratio; and consequently, the video data bits in all of the video streams occur on the communication channel at the same average bit rate, independent of the different frame lengths.

17 Claims, 6 Drawing Sheets

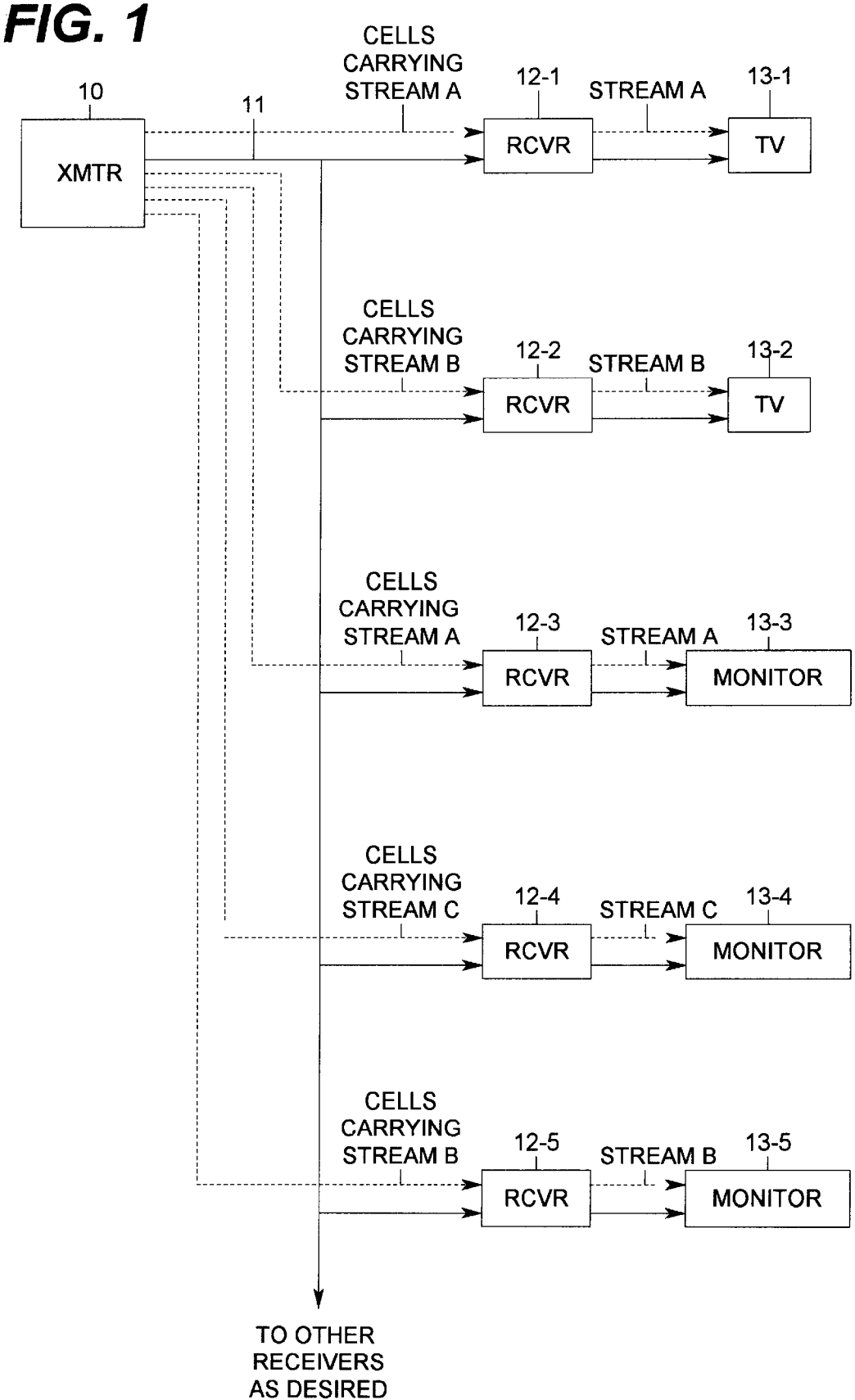

FIG. 2

S1 → PARTITION ALL VIDEO DATA STREAMS INTO FRAMES OF AT LEAST TWO DIFFERENT LENGTHS OF (N)(Lmin).

S2 → WRITE EACH FRAME INTO SEVERAL FULL CELLS AND ONE OR TWO PARTIAL CELLS WHERE EACH FULL CELL HOLDS X VIDEO DATA BITS WHILE EACH PARTIAL CELL HOLDS 0 TO X-1 VIDEO DATA BITS AND OTHER OVERHEAD BITS WHICH TOGETHER EQUAL X BITS.

S3 → SEND FULL CELLS AND PARTIAL CELLS OF ALL FRAMES AT A SINGLE CELL RATE.

S4 → LIMIT DIFFERENT FRAME LENGTHS TO THOSE WHERE N DIVIDED BY THE NUMBER OF FULL AND PARTIAL CELLS PER FRAME IS A SINGLE RATIO R.

FIG. 3

| CELL | STREAM A | STREAM B | STREAM C |
|---|---|---|---|
| C1 | FC=48 | FC=48 | FC=48 |
| C2 | FC | FC | FC |
| C3 | FC | FC | FC |
| C4 | FC | FC | FC |
| C5 | FC  FRAME | FC | FC |
| C6 | FC  N=3 | FC | FC |
| C7 | FC  Lmin=188W | FC | FC |
| C8 | FC | FC | FC |
| C9 | FC | FC | FC |
| C10 | FC | FC  FRAME | FC |
| C11 | FC | FC  N=5 | FC |
| C12 | PC=36+12 | FC  Lmin=188W | FC |
| C13 | FC | FC | FC |
| C14 | FC | FC | FC |
| C15 | FC | FC | FC |
| C16 | FC | FC | FC |
| C17 | FC | FC | FC  FRAME |
| C18 | FC | FC | FC  N=11 |
| C19 | FC  FRAME | FC | FC  Lmin=188W |
| C20 | FC | PC=28+20 | FC |
| C21 | FC | FC | FC |
| C22 | FC | FC | FC |
| C23 | FC | FC | FC |
| C24 | PC=36+12 | FC | FC |
| C25 | FC | FC | FC |
| C26 | FC | FC | FC |
| C27 | FC | FC | FC |
| C28 | FC | FC | FC |
| C29 | FC  FRAME | FC  FRAME | FC |
| C30 | FC | FC | FC |
| C31 | FC | FC | FC |
| C32 | FC | FC | FC |
| C33 | FC | FC | FC |
| C34 | FC | FC | FC |
| C35 | FC | FC | FC |
| C36 | PC=36+12 | FC | FC |
| C37 | FC | FC | FC |
| C38 | FC | FC | FC |
| C39 | FC | FC | FC |
| C40 | FC | PC=28+20 | FC |
| C41 | FC | FC | FC |
| C42 | FC | FC | FC |
| C43 | FC | FC | FC |
| C44 | FC | FC | PC=4+44 |
| C45 | FC | FC | FC |

FIG. 4

EQ. 1 → $\dfrac{\text{AVERAGE VIDEO DATA BIT RATE}}{\text{IN STREAM S}} \sim \left(\dfrac{\text{CELL}}{\text{RATE}}\right)(F)$   WHERE $F = \dfrac{(\text{VIDEO DATA PER FRAME IN STREAM S})}{(\text{VIDEO PLUS OVERHEAD PER FRAME IN STREAM S})}$ EQ. 2 → $F = \dfrac{(N \text{ FOR STREAM S})(L \text{ MIN})}{(FC + PC \text{ PER FRAME IN STREAM S})(X)}$ EQ. 3 → $F = \dfrac{(N)(188\,W)}{(FC + PC \text{ PER FRAME IN STREAM S})(48W)}$ EQ. 4 → FIND $N_i$ WHERE $\dfrac{(N_i)}{(FC + PC \text{ PER FRAME})} = $ SAME RATIO $R$ EQ. 5 → THEN ALL STREAMS, WHERE $N = N_i$, HAVE SAME AVERAGE VIDEO BIT RATE

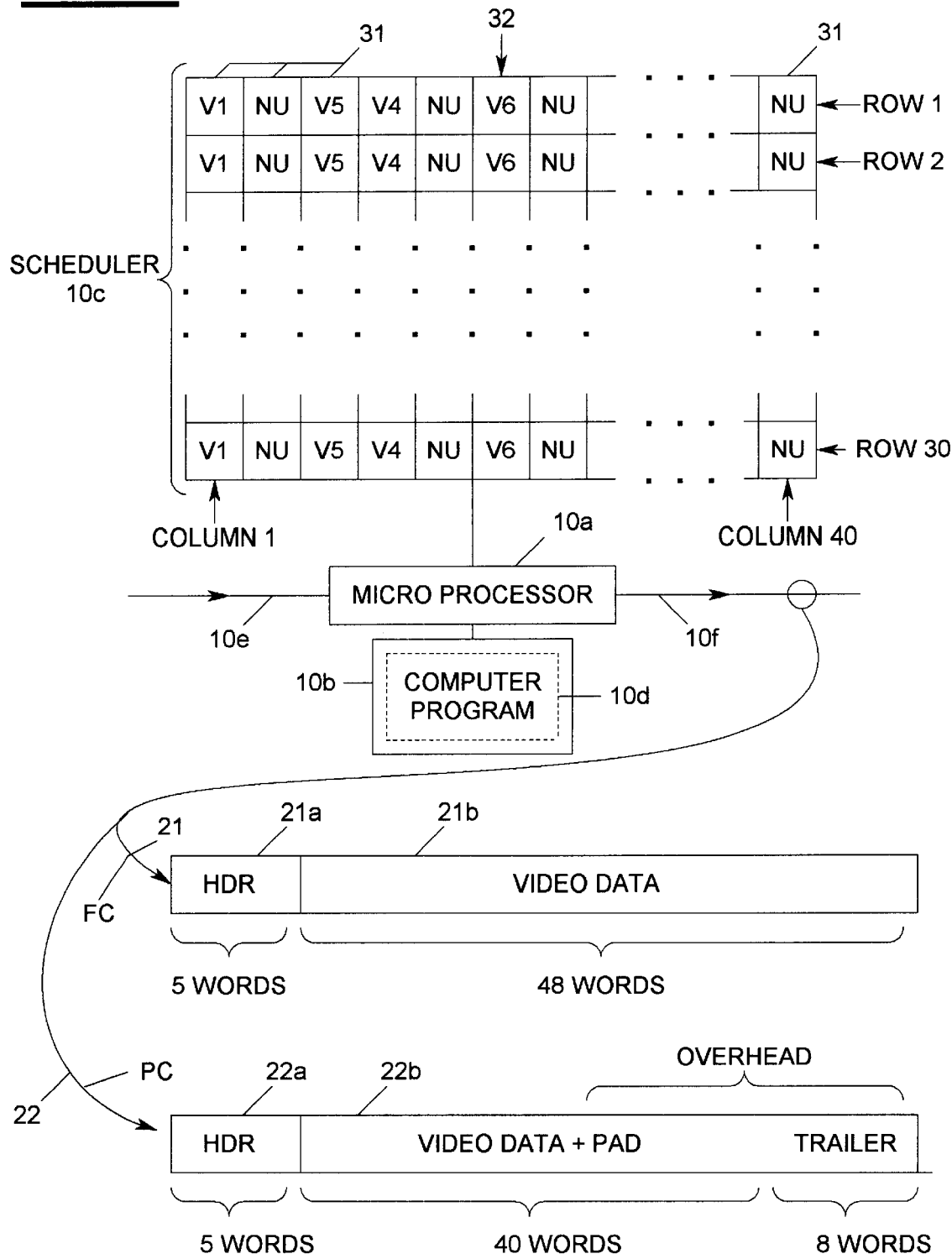

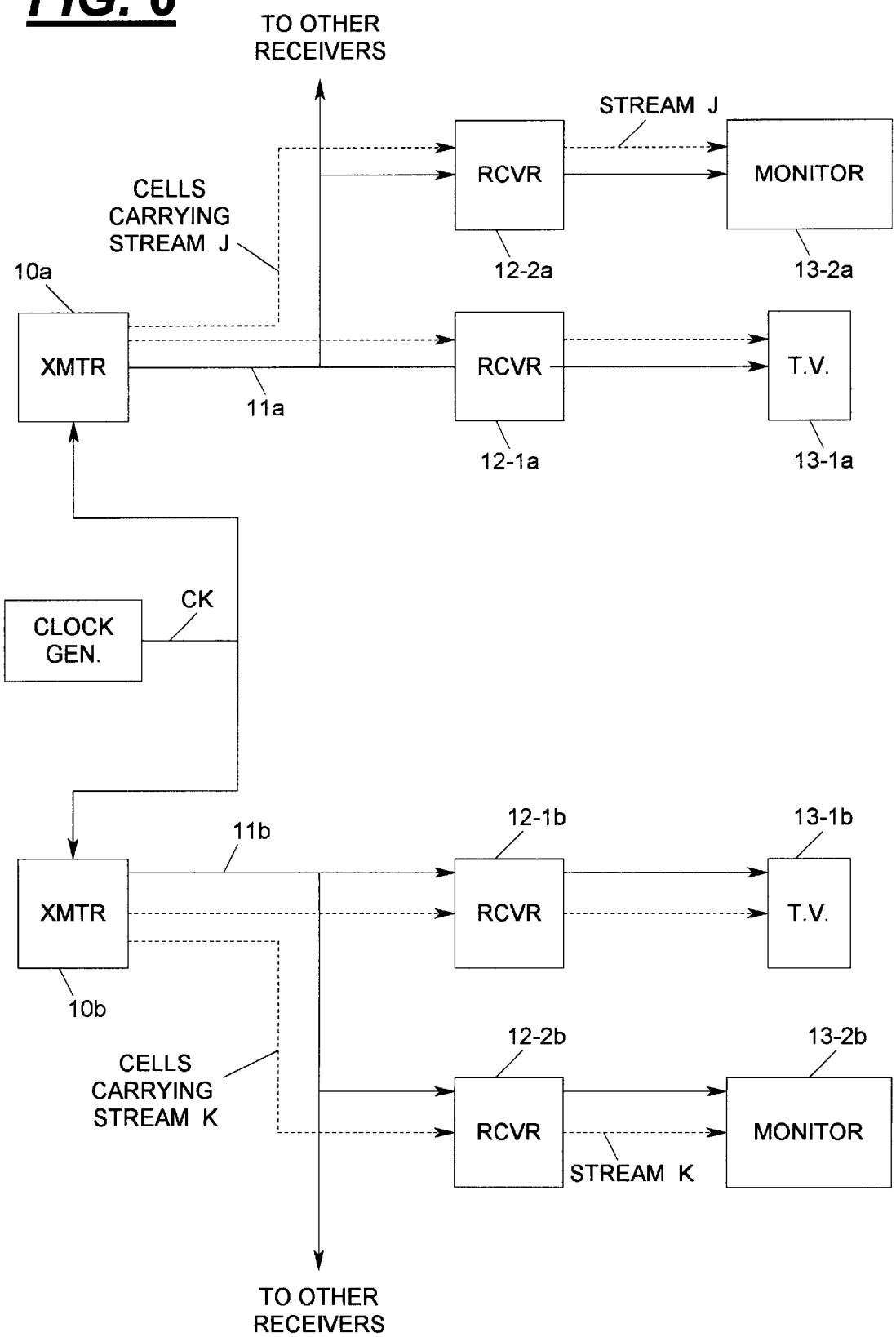

METHOD OF TRANSMITTING STREAMS OF VIDEO DATA, IN MULTI-LENGTH FRAMES, AT A SINGLE AVERAGE BIT RATE

BACKGROUND OF THE INVENTION:

This invention relates to digital video systems which send multiple streams of video data f rom a video library to respective sets of viewers. in the prior art, one such system is described in U.S. Pat. No. 5,583,561 which is entitled "Multi-Cast Digital video Server using Synchronization Groups".

An overview of the above prior art system is shown in FIG. 1 of patent '561. There, multiple video programs are stored in a video library 10 which is coupled to a video server 12; and, the video server 12 is coupled through a network interface circuit 18 and a distribution network 20 to a plurality of addressable display devices 22, 24, and 26. To receive a particular video program at a particular display device, a request is sent by a viewer via a telephone to the video server.

In patent '561, the requests for the video programs are placed by the video server into a predetermined number of synchronization groups. This is shown in FIGS. 5, 6A and 6B of patent '561. One synchronization group consists of the requests for a video program that are received between time T0 and T1; the next synchronization group consists of the requests for the same video program which are received between time T1 and T2; etc. Then, all of the viewers in a particular synchronization group are sent the requested video program starting at the same time; and each such transmission of the video program is called a "stream". In FIG. 5, the transmission of a video program which begins at time T0 is called STREAM #1; the transmission of the same program which begins at time T1 is called STREAM #2; etc.

On the distribution network 20, many video data streams can be sent simultaneously to the respective viewers. One particular way in which that is accomplished is to write small packets of each video stream into a series of cells, and to send the cells for all of the streams in a time-multiplexed fashion on the network to the respective viewers. For example, in a standard ATM distribution network, the streams are partitioned into frames of a particular length and a cyclic redundancy check is generated for each frame. Then, each frame and its corresponding cyclic redundancy check are written into a series of several full cells and one or two partial cells. Each full cell holds 48 bytes of video data; while each partial cell holds a combination of video data and/or the cyclic redundancy check for the frame and/or unused pad which together total 48 bytes.

A cyclic redundancy check is added to each frame because noise can occur at various points in the distribution network, which in turn causes the video data in certain frames to be corrupted. If the amount of noise at a particular point on the distribution network is relatively high, then a short frame length is preferable. Short frames which are corrupted can be discarded in the receiving module, with little distortion in the visual display perceived by the viewer.

However, at the end of each frame that is sent, extra processing steps must be performed in both the transmitting module and the receiving module. This extra processing is required because the partial cell at the end of each frame must be treated differently from the full cells; and, the start of a new frame must be set up. This extra processing requires a fixed amount of time regardless of frame size. Consequently, to minimize such extra processing, frames with a long length are desired.

Thus, a problem arises regarding what the optimal length for the frames should be. Further, the problem is made worse due to the fact that the average bit rate of the video data in a stream is a function of the frame length. Average bit rate varies with frame length because the amount of video data in the partial cells varies with frame length. Typically, in order to operate properly, all of the receiving modules need to receive the video data at a single predetermined average bit rate; and so the frame length cannot be selected based solely on noise considerations.

Accordingly, a primary object of the present invention is to provide a method of sending multiple streams of digital video data on a distribution network such that the above problem is overcome.

BRIEF SUMMARY OF THE INVENTION

With the present invention, multiple streams of digital video data are sent from a transmitting module to respective sets of receiving modules, by performing the following steps.

Initially, all of the video data streams are partitioned into frames of at least two different lengths, where each frame length is an integer multiple times a minimum frame length. Next, each frame is written into a series of full cells and one or two partial cells. Each full cell carries the same number of video data bits, while each partial cell carries video data bits and/or other overhead bits which together equal the number of video data bits in one full cell. Then, the full cells and partial cells for the frames in all of the streams are sent, in a time-multiplexed fashion, on a communication channel at a single cell rate. Further, in performing all of the above steps, a constraint is imposed whereby the different frame lengths are limited to those where the integer multiple of the minimum frame length, divided by the total number of full and partial cells per frame, is a single ratio.

By performing the above steps, the video data bits in all of the video streams occur on the communication channel at the same average bit rate. This single average bit rate is independent of the different frame lengths and the different number of video data bits in the partial cells, even though the cells for all of the streams are transmitted at the same rate. Consequently, the frame length in the stream to a particular receiving module can be increased as the amount of noise which that receiving module is experiencing on the communication channel decreases, and the average bit rate of the video data in each stream will stay the same.

BRIEF DESCRIPTION OF THE DRAWINGS:

FIG. 1 shows a video system in which a transmitting module electronically sends multiple streams of digital video data, in frames of different length, at a single average bit rate in accordance with the present invention.

FIG. 2 shows four steps which are performed by the transmitting module in the FIG. 1 system to thereby send the streams of video data in the different length frames at the single average bit rate.

FIG. 3 shows one particular example of three different length video data streams which are sent by the transmitter in the FIG. 1 system by performing the four steps of FIG. 2.

FIG. 4 shows a set of equations which explain why the four steps in FIG. 2 cause the video data in each video stream to have the same average bit rate.

FIG. 5 shows the structural details of one preferred embodiment for the transmitting module in FIG. 1.

FIG. 6 shows a modification to the video system of FIG. 1 in which two transmitting modules operate in parallel in accordance with the present invention.

DETAILED DESCRIPTION

Referring now to FIG. 1, it shows a video system in which digital video data is electronically transmitted in accordance with the present invention. This FIG. 1 video system includes an electronic transmitting module 10 which is coupled via a communications channel 11 to a plurality of receiving modules 12-1, 12-2, etc. Any desired number of receiving modules can be connected to the communications channel 11; and in FIG. 1, only five receiving modules are shown. Also in the FIG. 1 video system, each receiving module 12-1, 12-2, etc. is respectively coupled to a separate visual display 13-1, 13-2, etc., such as a television or computer monitor.

In operation, the transmitting module 10 sends a respective "stream" of video data through each receiving module to its visual display. Each stream is a series of video data bits which generate the picture and sound within the display that receives the stream. FIG. 1 shows an example where stream A is sent to the displays 13-1 and 13-3; stream B is sent to the displays 13-2 and 13-5; and stream C is sent to the display 13-4.

In order to send all of the video data streams on the communication channel 11 simultaneously, the transmitting module 10 sends each stream in a series of time-multiplexed cells. One series of cells which carries stream A is received by the receiving module 12-1, and another series of cells which also carries stream A is received by the receiving module 12-3. Similarly, one series of cells which carries stream B is received by the receiving module 12-2, and another series of cells which also carries stream B is received by the receiving module 12-5; etc. Each receiving module removes the video data stream from the cells which it receives and passes that video data to its respective visual display.

Within the transmitting module 10, four steps S1–S4 are performed in order to send all of the video data streams in the time multiplexed cells on the communication channel 11. Those steps S1–S4 are listed in FIG. 2.

Initially, in step S1, all of the video data streams are partitioned into frames of at least two different lengths. Here, the "length" of a frame means the number of video data bits in the frame. In performing step S1, each frame length is confined to an integer multiple times a minimum frame length. This is stated in step S1 of FIG. 2 wherein "N" is the integer multiple and Lmin is the minimum frame length.

Next, in step S2, each frame is written into a series of full cells and one or two partial cells. Each full cell carries the same number of video data bits, and "X" represents that number. Each partial cell carries from 0 to X–1 video data bits and other overhead bits which together total X bits.

In performing step S2, the total number of full cells per frame is the quotient of (N)(Lmin)÷X. All remaining video data bits R. from the frame are written into one partial cell. If that one partial cell also has room to hold a certain minimum amount of overhead data such as the cyclic redundancy check, then only a single partial cell is used. Otherwise, two partial cells are used.

Next, in step S3, the full cells and partial cells of all of the frames in all of the streams are sent on the communications channel 11, at a single cell rate. Further, in accordance with step S4, the different frame lengths are limited to those where the integer multiple "N" divided by the total number of full and partial cells per frame, is a single ratio. Many examples of this step will be described in detail shortly in conjunction with two tables (TABLE 1 and TABLE 2).

A primary feature which is achieved by performing the above steps S1–S4, is that the video data bits in each video stream are received by the visual displays at a single average bit rate. This single average bit rate is independent of the different frame lengths, independent of the different numbers of full cells in the frames, and independent of the different numbers of video data bits in the partial cells.

Turning now to FIG. 3, a specific example of the above steps S1–S4 will be described. In this example, the first forty-five cells C1 thru C45 of the three streams A–C are shown. All of the cells of all the streams A–C are sent on the communications channel 11 in a time multiplexed fashion at a single cell rate. Cell C1 of stream A is followed by cell C1 of stream B, which in turn is followed by cell C1 of stream C, which in turn is followed by cell C2 of stream A, etc.

In stream A, the video data bits are partitioned into frames of 3×188 words. Here, a "word" is any fixed number of bits, such as eight bits or thirty-two bits for example. By comparison, in stream B, the video data bits are partitioned into frames of 5×188 words; and in stream C, the video data bits are partitioned into frames of 11×188 words. Thus, each frame in stream A consists of 564 words of video data; each frame in stream B consists of 940 words of video data; and each frame in stream C consists of 2068 words of video data.

Each full cell for each of the video data streams A–C holds forty-eight video data words. Each partial cell holds from 0 to forty-seven video data words plus overhead words which together total forty-eight words. A single partial cell is used if it has room to hold a minimum of eight overhead words.

Thus in stream A, the number of full cells per frame is the quotient of 564 words divided by 48 words, which equals 11 full cells. Those full cells are followed by one partial cell; and the number of video data words in the partial cell is the remainder of 564 words divided by 48 words, which equals 36 words. Thus, the number of overhead words in each partial cell of stream A is 48 words minus 36 words or 12 words.

Similarly in stream B, the number of full cells per frame is the quotient of 940 words divided by 48 words, which equals 19 full cells. Those full cells are followed by one partial cell; and the number of video data words in the partial cell is the remainder of 940 words divided by 48 words, which equals 28 words. Thus, the number of overhead words in each partial cell of stream B is 48 words minus 28 words or 20 words.

Likewise in stream C, the number of full cells per frame is the quotient of 2068 words divided by 48 words, which equals 43 full cells. Those full cells are followed by one partial cell; and the number of video data words in the partial cell is the remainder of 2068 words divided by 48 words, which equals 4 words. Thus, the number of overhead words in each partial cell of stream C is 48 words minus 4 words or 44 words.

By simply comparing FIG. 3 with FIG. 2, it is seen that steps S1, S2, and S3 of FIG. 2 are performed. Further, by dividing the multiple N for each frame length in FIG. 3 by the number of full and partial cells in the frame, it is seen that the result is a single ratio R in accordance with step S4 of FIG. 2.

Specifically, for stream A the ratio R equals 3 divided by 12; for stream B the ratio R equals 5 divided by 20; for stream C the ratio R equals 11 divided by 44; and those ratios are equal to each other. Thus, the video data streams A–C in FIG. 3 have the same average bit rate, even though the partial cells in stream A carry 12 words of overhead and the partial cells in stream B carry 20 words of overhead and the partial cells in stream C carry 44 words of overhead.

Next, with reference to FIG. 4, a proof will be given which shows why the performance of steps S1–S4 causes the video data bits in each of the video streams to have the same average bit rate. In FIG. 4, this proof is given by equations 1 thru 5.

Equation 1 states that the average video data bit rate in any one particular stream S is proportional to the single rate at which cells are sent on the communication channel 11 times a fraction F which is less than 1. This fraction F accounts for the fact that each full cell holds X data bits, while each partial cell holds both data bits and: other overhead bits which together equal X bits. The numerator of the fraction F is the total video bits per frame in stream S, and the denominator is the total video bits and overhead bits per frame in stream S.

Next in equation 2, the numerator and the denominator of the fraction F are expressed in terms of their component parts. Specifically, the total video bits per frame in stream S is expressed as N×Lmin, where Lmin is the minimum frame length and N is an integer multiple. Likewise, the denominator is expressed as the total number of full and partial cells per frame in stream S times "X" which is the number of video data bits in each full cell.

Next, equation 3 re-writes equation 2 for the specific case where the minimum frame length Lmin equals 188 words and x equals 48 words. In equation 3, the words "W" cancel in the numerator and denominator; and so the fraction F is independent of the number of bits per word. Also in equation 3, the factor of 188 divided by 48 is a constant.

Next, equation 4 states that for particular values of N, the ratio of N divided by the total number of full and partial cells per frame will be the same. Those particular values of N are indicated as "Ni". Then, equation 5 states in all video data stream where N=Ni, the average video data bit rate will be the same.

In order to find the particular values of Ni where the ratio of Ni divided by the total number of full and partial cells per frame is the same, Table 1 and Table 2, as shown below, were constructed. In Table 1, the values of N from 2 thru 350 are listed in the left-most column. Then to the right of each value of N, various terms in equation 3 are listed for the corresponding values of N.

For example, in the second column from the left, the corresponding total number of video data words per frame is listed. Thus when N=2, the second column from the left shows that the total number of video data words per frame is 2×188, or 376.

In the third column from the left, the total number of full and partial cells per frame is listed. For example, when N=2, the number of full cells is the quotient of 376 divided by 48, which is 7; and those full cells are followed by one partial cell. So for N=2, the total number of. full and partial cells is 8.

In the fourth column from the left, the total number of video data words plus overhead words per frame is listed. Thus, the entry in the fourth column from the left equals the entry in the third column from the left times the number of video data words per full cell. So for N=2, the total number of video data words plus overhead words per frame is (8)(48), or 384.

In the fifth column from the left, the number of overhead words per frame is listed. Those overhead words equal the difference between the fourth and second column from the left. Thus for N=2, the number of overhead words per frame is 384–376, or 8.

Lastly, in the right-most column of Table 1, the ratio which is stated by equation 3 of FIG. 4 is given. For those value of N which yield the same ratio in the right-most column of Table 1, the corresponding video data streams will have the same average video data bit rate.

By examining the left-most and right-most columns of Table 1, the values of N which yield the same equation 3 ratios can be found. Performing this step yields Table 2. For those values of N that are in a particular entry in Table 2, the corresponding video data streams will have the same average video data bit rate. For example, the thirteenth entry in Table 2 shows that several video data streams will all have the same average video data bit rate when those streams are partitioned into frames of (N)(188) words and sent in cells of 48 words, if N is limited to 26, 39, 52, 65, 78, 91, 104, 117, 130, 143, 156, and 169.

Turning now to FIG. 5, the structural details of a preferred embodiment for the transmitting module 10 will be described. This FIG. 5 embodiment includes a digital microprocessor 10a, a digital memory 10b, and a digital scheduler circuit 10c, and those components 10a–10c are interconnected as shown.

Stored within the memory 10b is a computer program which directs the microprocessor 10a to perform all of the steps S1 thru S4 that were previously described in conjunction with FIG. 2. As an input, the microprocessor 10a receives the streams of video data in an unpartitioned form from an external source on an input terminal 10e. As an output, the microprocessor 10a sends the full cells FC in a format 21 on an output terminal 10f, and it sends the partial cells PC in a format 22 on the output terminal 10f.

Each full cell 21 in FIG. 5 consists of a 5-word header 21a which is followed by a 48-word packet 21b of video data. An address of a particular receiving module 12-1, 12-2, etc., from FIG. 1 is included in the header 21a which directs the full cell to that receiving module.

Each partial cell 22 in FIG. 5 consists of a 5-word header 22a which is followed by a 48-word packet that includes both video data and overhead data. Here again, an address in the header directs the partial cell to a particular receiving module.

The amount of video data which is in the packet 22b is the remainder of the frame length in words divided by 48; and the amount of overhead data in the packet is that which will make the packet 48-words long. This overhead data consists of an 8-word trailer, and a variable amount of pad which is not used. Various predetermined information is put in the trailer, such as a cyclic redundancy check on all of the video data bits in the full cells and partial cell which make-up a particular frame.

Included in the scheduler 10c are a plurality of registers 31 which are arranged in rows and columns. FIG. 5 shows a particular example in which the registers 31 are arranged in thirty rows and forty columns.

Stored within each register 31 is either the address of a particular receiving module 12-1, 12-2, etc., or an indication that the register is not used. For example in FIG. 5, each register in column 1 stores the address of the receiving module for a particular viewer V1; whereas each register in column 40 indicates that the register is not used.

Also included in the scheduler 10c is a pointer 32 which sequentially moves, at a predetermined fixed rate, from one register to another. Each time the pointer 32 moves to a new register, the microprocessor 10*a* reads the content of the register. If the register identifies a particular receiving module, then either a full cell or a partial cell is sent to that module in accordance with steps S1 thru S4 of FIG. 2. If the register is not used, then the microprocessor 10*a* simply waits for the pointer 32 to move to the next register.

One preferred method and one preferred circuit for electronically transmitting digital video data in accordance with the present invention have now been described in detail. In addition, however, various changes can be made to those details without departing from the nature and spirit of the invention.

For example, the video system of FIG. 1 can be modified to the video system of FIG. 6. This FIG. 6 system includes two transmitting modules 10*a* and 10*b* which send streams of video data to respective receiving modules on two separate communication channels 11*a* and 11*b*. Each transmitting module performs the steps S1–S4 of FIG. 2, and each transmitting module has the interval structure of FIG. 5. A single clock generator circuit 40 is coupled to both of the transmitting modules, and it provides a clock signal CK which moves the pointer 32 in the scheduler 10*c* within each transmitting module.

As another modification, the video data which is sent in the cells 21 and 22 of FIG. 5 can be replaced with any other type of digital data. To implement this modification, the FIG. 5 transmitting module simply performs the steps S1–S4 of FIG. 2 on the digital data that is to be sent.

Accordingly, it is to be understood that the invention is not limited to just the illustrated preferred method and circuit, but is defined by the appended claims.

TABLE 1

| N | N × 188 | FC + PC | (FC + PC)(48) | OV | N × 188/(FC + PC)48 |
|---|---|---|---|---|---|
| 2 | 376 | 8 | 384 | 8 | 0.9791666667 |
| 3 | 564 | 12 | 576 | 12 | 0.9791666667 |
| 4 | 752 | 16 | 768 | 16 | 0.9791666667 |
| 5 | 940 | 20 | 960 | 20 | 0.9791666667 |
| 6 | 1128 | 24 | 1152 | 24 | 0.9791666667 |
| 7 | 1316 | 28 | 1344 | 28 | 0.9791666667 |
| 8 | 1504 | 32 | 1536 | 32 | 0.9791666667 |
| 9 | 1692 | 36 | 1728 | 36 | 0.9791666667 |
| 10 | 1880 | 40 | 1920 | 40 | 0.9791666667 |
| 11 | 2068 | 44 | 2112 | 44 | 0.9791666667 |
| 12 | 2256 | 48 | 2304 | 48 | 0.9791666667 |
| 13 | 2444 | 52 | 2496 | 52 | 0.9791666667 |
| 14 | 2632 | 55 | 2640 | 8 | 0.9969696970 |
| 15 | 2820 | 59 | 2832 | 12 | 0.9957627119 |
| 16 | 3008 | 63 | 3024 | 16 | 0.9947089947 |
| 17 | 3196 | 67 | 3216 | 20 | 0.9937810945 |
| 18 | 3384 | 71 | 3408 | 24 | 0.9929577465 |
| 19 | 3572 | 75 | 3600 | 28 | 0.9922222222 |
| 20 | 3760 | 79 | 3792 | 32 | 0.9915611814 |
| 21 | 3948 | 83 | 3984 | 36 | 0.9909638554 |
| 22 | 4136 | 87 | 4176 | 40 | 0.9904214559 |
| 23 | 4324 | 91 | 4368 | 44 | 0.9899267399 |
| 24 | 4512 | 95 | 4560 | 48 | 0.9894736842 |
| 25 | 4700 | 99 | 4752 | 52 | 0.9890572391 |
| 26 | 4888 | 102 | 4896 | 8 | 0.9983660131 |
| 27 | 5076 | 106 | 5088 | 12 | 0.9976415094 |
| 28 | 5264 | 110 | 5280 | 16 | 0.9969696970 |
| 29 | 5452 | 114 | 5472 | 20 | 0.9963450292 |
| 30 | 5640 | 118 | 5664 | 24 | 0.9957627119 |
| 31 | 5828 | 122 | 5856 | 28 | 0.9952185792 |
| 32 | 6016 | 126 | 6048 | 32 | 0.9947089947 |
| 33 | 6204 | 130 | 6240 | 36 | 0.9942307692 |
| 34 | 6392 | 134 | 6432 | 40 | 0.9937810945 |
| 35 | 6580 | 138 | 6624 | 44 | 0.9933574879 |
| 36 | 6768 | 142 | 6816 | 48 | 0.9929577465 |
| 37 | 6956 | 146 | 7008 | 52 | 0.9925799087 |

TABLE 1-continued

| N | N × 188 | FC + PC | (FC + PC)(48) | OV | N × 188/(FC + PC)48 |
|---|---|---|---|---|---|
| 38 | 7144 | 149 | 7152 | 8 | 0.9988814318 |
| 39 | 7332 | 153 | 7344 | 12 | 0.9983660131 |
| 40 | 7520 | 157 | 7536 | 16 | 0.9978768577 |
| 41 | 7708 | 161 | 7728 | 20 | 0.9974120083 |
| 42 | 7896 | 165 | 7920 | 24 | 0.9969696970 |
| 43 | 8084 | 169 | 8112 | 28 | 0.9965483235 |
| 44 | 8272 | 173 | 8304 | 32 | 0.9961464355 |
| 45 | 8460 | 177 | 8496 | 36 | 0.9957627119 |
| 46 | 8648 | 181 | 8688 | 40 | 0.9953959484 |
| 47 | 8836 | 185 | 8880 | 44 | 0.9950450450 |
| 48 | 9024 | 189 | 9072 | 48 | 0.9947089947 |
| 49 | 9212 | 193 | 9264 | 52 | 0.9943868739 |
| 50 | 9400 | 196 | 9408 | 8 | 0.9991496599 |
| 51 | 9588 | 200 | 9600 | 12 | 0.9987500000 |
| 52 | 9776 | 204 | 9792 | 16 | 0.9983660131 |
| 53 | 9964 | 208 | 9984 | 20 | 0.9979967949 |
| 54 | 10152 | 212 | 10176 | 24 | 0.9976415094 |
| 55 | 10340 | 216 | 10368 | 28 | 0.9972993827 |
| 56 | 10528 | 220 | 10560 | 32 | 0.9969696970 |
| 57 | 10716 | 224 | 10752 | 36 | 0.9966517857 |
| 58 | 10904 | 228 | 10944 | 40 | 0.9963450292 |
| 59 | 11092 | 232 | 11136 | 44 | 0.9960488506 |
| 60 | 11280 | 236 | 11328 | 48 | 0.9957627119 |
| 61 | 11468 | 240 | 11520 | 52 | 0.9954861111 |
| 62 | 11656 | 243 | 11664 | 8 | 0.9993141289 |
| 63 | 11844 | 247 | 11856 | 12 | 0.9989878543 |
| 64 | 12032 | 251 | 12048 | 16 | 0.9986719788 |
| 65 | 12220 | 255 | 12240 | 20 | 0.9983660131 |
| 66 | 12408 | 259 | 12432 | 24 | 0.9980694981 |
| 67 | 12596 | 263 | 12624 | 28 | 0.9977820025 |
| 68 | 12784 | 267 | 12816 | 32 | 0.9975031211 |
| 69 | 12972 | 271 | 13008 | 36 | 0.9972324723 |
| 70 | 13160 | 275 | 13200 | 40 | 0.9969696970 |
| 71 | 13348 | 279 | 13392 | 44 | 0.9967144564 |
| 72 | 13536 | 283 | 13584 | 48 | 0.9964664311 |
| 73 | 13724 | 287 | 13776 | 52 | 0.9962253194 |
| 74 | 13912 | 290 | 13920 | 8 | 0.9994252874 |
| 75 | 14100 | 294 | 14112 | 12 | 0.9991496599 |
| 76 | 14288 | 298 | 14304 | 16 | 0.9988814318 |
| 77 | 14476 | 302 | 14496 | 20 | 0.9986203091 |
| 78 | 14664 | 306 | 14688 | 24 | 0.9983660131 |
| 79 | 14852 | 310 | 14880 | 28 | 0.9981182796 |
| 80 | 15040 | 314 | 15072 | 32 | 0.9978768577 |
| 81 | 15228 | 318 | 15264 | 36 | 0.9976415094 |
| 82 | 15416 | 322 | 15456 | 40 | 0.9974120083 |
| 83 | 15604 | 326 | 15648 | 44 | 0.9971881391 |
| 84 | 15792 | 330 | 15840 | 48 | 0.9969696970 |
| 85 | 15980 | 334 | 16032 | 52 | 0.9967564870 |
| 86 | 16168 | 337 | 16176 | 8 | 0.9995054402 |
| 87 | 16356 | 341 | 16368 | 12 | 0.9992668622 |
| 88 | 16544 | 345 | 16560 | 16 | 0.9990338164 |
| 89 | 16732 | 349 | 16752 | 20 | 0.9988061127 |
| 90 | 16920 | 353 | 16944 | 24 | 0.9985835694 |
| 91 | 17108 | 357 | 17136 | 28 | 0.9983660131 |
| 92 | 17296 | 361 | 17328 | 32 | 0.9981532779 |
| 93 | 17484 | 365 | 17520 | 36 | 0.9979452055 |
| 94 | 17672 | 369 | 17712 | 40 | 0.9977416441 |
| 95 | 17860 | 373 | 17904 | 44 | 0.9975424486 |
| 96 | 18048 | 377 | 18096 | 48 | 0.9973474801 |
| 97 | 18236 | 381 | 18288 | 52 | 0.9971566054 |
| 98 | 18424 | 384 | 18432 | 8 | 0.9995659722 |
| 99 | 18612 | 388 | 18624 | 12 | 0.9993356701 |
| 100 | 18800 | 392 | 18816 | 16 | 0.9991496599 |
| 101 | 18988 | 396 | 19008 | 20 | 0.9989478114 |
| 102 | 19176 | 400 | 19200 | 24 | 0.9987500000 |
| 103 | 19364 | 404 | 19392 | 28 | 0.9985561056 |
| 104 | 19552 | 408 | 19584 | 32 | 0.9983660131 |
| 105 | 19740 | 412 | 19776 | 36 | 0.9981796117 |
| 106 | 19928 | 416 | 19968 | 40 | 0.9979967949 |
| 107 | 20116 | 420 | 20160 | 44 | 0.9978174603 |
| 108 | 20304 | 424 | 20352 | 48 | 0.9976415094 |
| 109 | 20492 | 428 | 20544 | 52 | 0.9974688474 |
| 110 | 20680 | 431 | 20688 | 8 | 0.9996133024 |
| 111 | 20868 | 435 | 20880 | 12 | 0.9994252874 |
| 112 | 21056 | 439 | 21072 | 16 | 0.9992406986 |
| 113 | 21244 | 443 | 21264 | 20 | 0.9990594432 |

TABLE 1-continued

| N | N × 188 | FC + PC | (FC + PC)(48) | OV | N × 188/ (FC + PC)48 |
|---|---|---|---|---|---|
| 114 | 21432 | 447 | 21456 | 24 | 0.9988814318 |
| 115 | 21620 | 451 | 21648 | 28 | 0.9987065780 |
| 116 | 21808 | 455 | 21840 | 32 | 0.9985347985 |
| 117 | 21996 | 459 | 22032 | 36 | 0.9983660131 |
| 118 | 22184 | 463 | 22224 | 40 | 0.9982001440 |
| 119 | 22372 | 467 | 22416 | 44 | 0.9980371163 |
| 120 | 22560 | 471 | 22608 | 48 | 0.9978768577 |
| 121 | 22748 | 475 | 22800 | 52 | 0.9977192982 |
| 122 | 22936 | 478 | 22944 | 8 | 0.9996513250 |
| 123 | 23124 | 482 | 23136 | 12 | 0.9994813278 |
| 124 | 23312 | 486 | 23328 | 16 | 0.9993141289 |
| 125 | 23500 | 490 | 23520 | 20 | 0.9991496599 |
| 126 | 23688 | 494 | 23712 | 24 | 0.9989878543 |
| 127 | 23876 | 498 | 23904 | 28 | 0.9988286479 |
| 128 | 24064 | 502 | 24096 | 32 | 0.9986719788 |
| 129 | 24252 | 506 | 24288 | 36 | 0.9985177866 |
| 130 | 24440 | 510 | 24480 | 40 | 0.9983660131 |
| 131 | 24628 | 514 | 24672 | 44 | 0.9982166018 |
| 132 | 24816 | 518 | 24864 | 48 | 0.9980694981 |
| 133 | 25004 | 522 | 25056 | 52 | 0.9979246488 |
| 134 | 25192 | 525 | 25200 | 8 | 0.9996825397 |
| 135 | 25380 | 529 | 25392 | 12 | 0.9995274102 |
| 136 | 25568 | 533 | 25584 | 16 | 0.9993746091 |
| 137 | 25756 | 537 | 25776 | 20 | 0.9992240844 |
| 138 | 25944 | 541 | 25968 | 24 | 0.9990757856 |
| 139 | 26132 | 545 | 26160 | 28 | 0.9989296636 |
| 140 | 26320 | 549 | 26352 | 32 | 0.9987856709 |
| 141 | 26508 | 553 | 26544 | 36 | 0.9986437613 |
| 142 | 26696 | 557 | 26736 | 40 | 0.9985038899 |
| 143 | 26884 | 561 | 26928 | 44 | 0.9983660131 |
| 144 | 27072 | 565 | 27120 | 48 | 0.9982300885 |
| 145 | 27260 | 569 | 27312 | 52 | 0.9980960750 |
| 146 | 27448 | 572 | 27456 | 8 | 0.9997086247 |
| 147 | 27636 | 576 | 27648 | 12 | 0.9995659722 |
| 148 | 27824 | 580 | 27840 | 16 | 0.9994252874 |
| 149 | 28012 | 584 | 28032 | 20 | 0.9992865297 |
| 150 | 28200 | 588 | 28224 | 24 | 0.9991496599 |
| 151 | 28388 | 592 | 28416 | 28 | 0.9990146396 |
| 152 | 28576 | 596 | 28608 | 32 | 0.9988814318 |
| 153 | 28764 | 600 | 28800 | 36 | 0.9987500000 |
| 154 | 28952 | 604 | 28992 | 40 | 0.9986203091 |
| 155 | 29140 | 608 | 29184 | 44 | 0.9984923246 |
| 156 | 29328 | 612 | 29376 | 48 | 0.9983660131 |
| 157 | 29516 | 616 | 29568 | 52 | 0.9982413420 |
| 158 | 29704 | 619 | 29712 | 8 | 0.9997307485 |
| 159 | 29892 | 623 | 29904 | 12 | 0.9995987159 |
| 160 | 30080 | 627 | 30096 | 16 | 0.9994683679 |
| 161 | 30268 | 631 | 30288 | 20 | 0.9993396725 |
| 162 | 30456 | 635 | 30480 | 24 | 0.9992125984 |
| 163 | 30644 | 639 | 30672 | 28 | 0.9990871153 |
| 164 | 30832 | 643 | 30864 | 32 | 0.9989631934 |
| 165 | 31020 | 647 | 31056 | 36 | 0.9988408037 |
| 166 | 31208 | 651 | 31248 | 40 | 0.9987199181 |
| 167 | 31396 | 655 | 31440 | 44 | 0.9986005089 |
| 168 | 31584 | 659 | 31632 | 48 | 0.9984825493 |
| 169 | 31772 | 663 | 31824 | 52 | 0.9983660131 |
| 170 | 31960 | 666 | 31968 | 8 | 0.9997497497 |
| 171 | 32148 | 670 | 32160 | 12 | 0.9996268657 |
| 172 | 32336 | 674 | 32352 | 16 | 0.9995054402 |
| 173 | 32524 | 678 | 32544 | 20 | 0.9993854474 |
| 174 | 32712 | 682 | 32736 | 24 | 0.9992668622 |
| 175 | 32900 | 686 | 32928 | 28 | 0.9991496599 |
| 176 | 33088 | 690 | 33120 | 32 | 0.9990338164 |
| 177 | 33276 | 694 | 33312 | 36 | 0.9989193084 |
| 178 | 33464 | 698 | 33504 | 40 | 0.9988061127 |
| 179 | 33652 | 702 | 33696 | 44 | 0.9986942070 |
| 180 | 33840 | 706 | 33888 | 48 | 0.9985835694 |
| 181 | 34028 | 710 | 34080 | 52 | 0.9984741784 |
| 182 | 34216 | 713 | 34224 | 8 | 0.9997662459 |
| 183 | 34404 | 717 | 34416 | 12 | 0.9996513250 |
| 184 | 34592 | 721 | 34608 | 16 | 0.9995376792 |
| 185 | 34780 | 725 | 34800 | 20 | 0.9994252874 |
| 186 | 34968 | 729 | 34992 | 24 | 0.9993141289 |
| 187 | 35156 | 733 | 35184 | 28 | 0.9992041837 |
| 188 | 35344 | 737 | 35376 | 32 | 0.9990954319 |
| 189 | 35532 | 741 | 35568 | 36 | 0.9989878543 |
| 190 | 35720 | 745 | 35760 | 40 | 0.9988814318 |
| 191 | 35908 | 749 | 35952 | 44 | 0.9987761460 |
| 192 | 36096 | 753 | 36144 | 48 | 0.9986719788 |
| 193 | 36284 | 757 | 36336 | 52 | 0.9985689124 |
| 194 | 36472 | 760 | 36480 | 8 | 0.9997807018 |
| 195 | 36660 | 764 | 36672 | 12 | 0.9996727749 |
| 196 | 36848 | 768 | 36864 | 16 | 0.9995659722 |
| 197 | 37036 | 772 | 37056 | 20 | 0.9994602763 |
| 198 | 37224 | 776 | 37248 | 24 | 0.9993556701 |
| 199 | 37412 | 780 | 37440 | 28 | 0.9992521368 |
| 200 | 37600 | 784 | 37632 | 32 | 0.9991496599 |
| 201 | 37788 | 788 | 37824 | 36 | 0.9990482234 |
| 202 | 37976 | 792 | 38016 | 40 | 0.9989478114 |
| 203 | 38164 | 796 | 38208 | 44 | 0.9988484087 |
| 204 | 38352 | 800 | 38400 | 48 | 0.9987500000 |
| 205 | 38540 | 804 | 38592 | 52 | 0.9986525705 |
| 206 | 38728 | 807 | 38736 | 8 | 0.9997934738 |
| 207 | 38916 | 811 | 38928 | 12 | 0.9996917386 |
| 208 | 39104 | 815 | 39120 | 16 | 0.9995910020 |
| 209 | 39292 | 819 | 39312 | 20 | 0.9994912495 |
| 210 | 39480 | 823 | 39504 | 24 | 0.9993924666 |
| 211 | 39668 | 827 | 39696 | 28 | 0.9992946393 |
| 212 | 39856 | 831 | 39888 | 32 | 0.9991977537 |
| 213 | 40044 | 835 | 40080 | 36 | 0.9991017964 |
| 214 | 40232 | 839 | 40272 | 40 | 0.9990067541 |
| 215 | 40420 | 843 | 40464 | 44 | 0.9989126137 |
| 216 | 40608 | 847 | 40656 | 48 | 0.9988193625 |
| 217 | 40796 | 851 | 40848 | 52 | 0.9987269879 |
| 218 | 40984 | 854 | 40992 | 8 | 0.9998048400 |
| 219 | 41172 | 858 | 41184 | 12 | 0.9997086247 |
| 220 | 41360 | 862 | 41376 | 16 | 0.9996133024 |
| 221 | 41548 | 866 | 41568 | 20 | 0.9995188607 |
| 222 | 41736 | 870 | 41760 | 24 | 0.9994252874 |
| 223 | 41924 | 874 | 41952 | 28 | 0.9993325706 |
| 224 | 42112 | 878 | 42144 | 32 | 0.9992406986 |
| 225 | 42300 | 882 | 42336 | 36 | 0.9991496599 |
| 226 | 42488 | 886 | 42528 | 40 | 0.9990594432 |
| 227 | 42676 | 890 | 42720 | 44 | 0.9989700375 |
| 228 | 42864 | 894 | 42912 | 48 | 0.9988814318 |
| 229 | 43052 | 898 | 43104 | 52 | 0.9987936154 |
| 230 | 43240 | 901 | 43248 | 8 | 0.9998150203 |
| 231 | 43428 | 905 | 43440 | 12 | 0.9997237569 |
| 232 | 43616 | 909 | 43632 | 16 | 0.9996332967 |
| 233 | 43804 | 913 | 43824 | 20 | 0.9995436291 |
| 234 | 43992 | 917 | 44016 | 24 | 0.9994547437 |
| 235 | 44180 | 921 | 44208 | 28 | 0.9993666305 |
| 236 | 44368 | 925 | 44400 | 32 | 0.9992792793 |
| 237 | 44556 | 929 | 44592 | 36 | 0.9991926803 |
| 238 | 44744 | 933 | 44784 | 40 | 0.9991068239 |
| 239 | 44932 | 937 | 44976 | 44 | 0.9990217005 |
| 240 | 45120 | 941 | 45168 | 48 | 0.9989373007 |
| 241 | 45308 | 945 | 45360 | 52 | 0.9988536155 |
| 242 | 45496 | 948 | 45504 | 8 | 0.9998241913 |
| 243 | 45684 | 952 | 45696 | 12 | 0.9997373950 |
| 244 | 45872 | 956 | 45888 | 16 | 0.9996513250 |
| 245 | 46060 | 960 | 46080 | 20 | 0.9995659722 |
| 246 | 46248 | 964 | 46272 | 24 | 0.9994813278 |
| 247 | 46436 | 968 | 46464 | 28 | 0.9993973829 |
| 248 | 46624 | 972 | 46656 | 32 | 0.9993141289 |
| 249 | 46812 | 976 | 46848 | 36 | 0.9992315574 |
| 250 | 47000 | 980 | 47040 | 40 | 0.9991496599 |
| 251 | 47188 | 984 | 47232 | 44 | 0.9990684282 |
| 252 | 47376 | 988 | 47424 | 48 | 0.9989878543 |
| 253 | 47564 | 992 | 47616 | 52 | 0.9989079301 |
| 254 | 47752 | 995 | 47760 | 8 | 0.9998324958 |
| 255 | 47940 | 999 | 47952 | 12 | 0.9997497497 |
| 256 | 48128 | 1003 | 48144 | 16 | 0.9996676637 |
| 257 | 48316 | 1007 | 48336 | 20 | 0.9995862297 |
| 258 | 48504 | 1011 | 48528 | 24 | 0.9995054402 |
| 259 | 48692 | 1015 | 48720 | 28 | 0.9994252874 |
| 260 | 48880 | 1019 | 48912 | 32 | 0.9993457638 |
| 261 | 49068 | 1023 | 49104 | 36 | 0.9992668622 |
| 262 | 49256 | 1027 | 49296 | 40 | 0.9991885751 |
| 263 | 49444 | 1031 | 49488 | 44 | 0.9991108956 |
| 264 | 49632 | 1035 | 49680 | 48 | 0.9990338164 |
| 265 | 49820 | 1039 | 49872 | 52 | 0.9989573308 |

TABLE 1-continued

| N | N × 188 | FC + PC | (FC + PC)(48) | OV | N × 188/ (FC + PC)48 |
|---|---|---|---|---|---|
| 266 | 50008 | 1042 | 50016 | 8 | 0.9998400512 |
| 267 | 50196 | 1046 | 50208 | 12 | 0.9997609943 |
| 268 | 50384 | 1050 | 50400 | 16 | 0.9996825397 |
| 269 | 50572 | 1054 | 50592 | 20 | 0.9996046806 |
| 270 | 50760 | 1058 | 50784 | 24 | 0.9995274102 |
| 271 | 50948 | 1062 | 50976 | 28 | 0.9994507219 |
| 272 | 51136 | 1066 | 51168 | 32 | 0.9993746091 |
| 273 | 51324 | 1070 | 51360 | 36 | 0.9992990654 |
| 274 | 51512 | 1074 | 51552 | 40 | 0.9992240844 |
| 275 | 51700 | 1078 | 51744 | 44 | 0.9991496599 |
| 276 | 51888 | 1082 | 51936 | 48 | 0.9990757856 |
| 277 | 52076 | 1086 | 52128 | 52 | 0.9990024555 |
| 278 | 52264 | 1089 | 52272 | 8 | 0.9998469544 |
| 279 | 52452 | 1093 | 52464 | 12 | 0.9997712717 |
| 280 | 52640 | 1097 | 52656 | 16 | 0.9996961410 |
| 281 | 52828 | 1101 | 52848 | 20 | 0.9996215562 |
| 282 | 53016 | 1105 | 53040 | 24 | 0.9995475113 |
| 283 | 53204 | 1109 | 53232 | 28 | 0.9994740006 |
| 284 | 53392 | 1113 | 53424 | 32 | 0.9994010183 |
| 285 | 53580 | 1117 | 53616 | 36 | 0.9993285586 |
| 286 | 53768 | 1121 | 53808 | 40 | 0.9992566161 |
| 287 | 53956 | 1125 | 54000 | 44 | 0.9991851852 |
| 288 | 54144 | 1129 | 54192 | 48 | 0.9991142604 |
| 289 | 54332 | 1133 | 54384 | 52 | 0.9990438364 |
| 290 | 54520 | 1136 | 54528 | 8 | 0.9998532864 |
| 291 | 54708 | 1140 | 54720 | 12 | 0.9997807018 |
| 292 | 54896 | 1144 | 54912 | 16 | 0.9997086247 |
| 293 | 55084 | 1148 | 55104 | 20 | 0.9996370499 |
| 294 | 55272 | 1152 | 55296 | 24 | 0.9995659722 |
| 295 | 55460 | 1156 | 55488 | 28 | 0.9994953864 |
| 296 | 55648 | 1160 | 55680 | 32 | 0.9994252874 |
| 297 | 55836 | 1164 | 55872 | 36 | 0.9993556701 |
| 298 | 56024 | 1168 | 56064 | 40 | 0.9992865297 |
| 299 | 56212 | 1172 | 56256 | 44 | 0.9992178612 |
| 300 | 56400 | 1176 | 56448 | 48 | 0.9991496599 |
| 301 | 56588 | 1180 | 56640 | 52 | 0.9990819209 |
| 302 | 56776 | 1183 | 56784 | 8 | 0.9998591152 |
| 303 | 56964 | 1187 | 56976 | 12 | 0.9997893850 |
| 304 | 57152 | 1191 | 57168 | 16 | 0.9997201231 |
| 305 | 57340 | 1195 | 57360 | 20 | 0.9996513250 |
| 306 | 57528 | 1199 | 57552 | 24 | 0.9995829858 |
| 307 | 57716 | 1203 | 57744 | 28 | 0.9995151011 |
| 308 | 57904 | 1207 | 57936 | 32 | 0.9994476664 |
| 309 | 58092 | 1211 | 58128 | 36 | 0.9993806771 |
| 310 | 58280 | 1215 | 58320 | 40 | 0.9993141289 |
| 311 | 58468 | 1219 | 58512 | 44 | 0.9992480175 |
| 312 | 58656 | 1223 | 58704 | 48 | 0.9991823385 |
| 313 | 58844 | 1227 | 58896 | 52 | 0.9991170877 |
| 314 | 59032 | 1230 | 59040 | 8 | 0.9998644986 |
| 315 | 59220 | 1234 | 59232 | 12 | 0.9997974068 |
| 316 | 59408 | 1238 | 59424 | 16 | 0.9997307485 |
| 317 | 59596 | 1242 | 59616 | 20 | 0.9996645196 |
| 318 | 59784 | 1246 | 59808 | 24 | 0.9995987159 |
| 319 | 59972 | 1250 | 60000 | 28 | 0.9995333333 |
| 320 | 60160 | 1254 | 60192 | 32 | 0.9994683679 |
| 321 | 60348 | 1258 | 60384 | 36 | 0.9994038156 |
| 322 | 60536 | 1262 | 60576 | 40 | 0.9993396725 |
| 323 | 60724 | 1266 | 60768 | 44 | 0.9992759347 |
| 324 | 60912 | 1270 | 60960 | 48 | 0.9992125984 |
| 325 | 61100 | 1274 | 61152 | 52 | 0.9991496599 |
| 326 | 61288 | 1277 | 61296 | 8 | 0.9998694858 |
| 327 | 61476 | 1281 | 61488 | 12 | 0.9998048400 |
| 328 | 61664 | 1285 | 61680 | 16 | 0.9997405966 |
| 329 | 61852 | 1289 | 61872 | 20 | 0.9996767520 |
| 330 | 62040 | 1293 | 62064 | 24 | 0.9996133024 |
| 331 | 62228 | 1297 | 62256 | 28 | 0.9995502442 |
| 332 | 62416 | 1301 | 62448 | 32 | 0.9994875737 |
| 333 | 62604 | 1305 | 62640 | 36 | 0.9994252874 |
| 334 | 62792 | 1309 | 62832 | 40 | 0.9993633817 |
| 335 | 62980 | 1313 | 63024 | 44 | 0.9993018533 |
| 336 | 63168 | 1317 | 63216 | 48 | 0.9992406986 |
| 337 | 63356 | 1321 | 63408 | 52 | 0.9991799142 |
| 338 | 63544 | 1324 | 63552 | 8 | 0.9998741188 |
| 339 | 63732 | 1328 | 63744 | 12 | 0.9998117470 |
| 340 | 63920 | 1332 | 63936 | 16 | 0.9997497497 |
| 341 | 64108 | 1336 | 64128 | 20 | 0.9996881238 |

TABLE 1-continued

| N | N × 188 | FC + PC | (FC + PC)(48) | OV | N × 188/ (FC + PC)48 |
|---|---|---|---|---|---|
| 342 | 64296 | 1340 | 64320 | 24 | 0.9996268657 |
| 343 | 64484 | 1344 | 64512 | 28 | 0.9995659722 |
| 344 | 64672 | 1348 | 64704 | 32 | 0.9995054402 |
| 345 | 64860 | 1352 | 64896 | 36 | 0.9994452663 |
| 346 | 65048 | 1356 | 65088 | 40 | 0.9993854474 |
| 347 | 65236 | 1360 | 65260 | 44 | 0.9993259804 |
| 348 | 65424 | 1364 | 65472 | 48 | 0.9992668622 |
| 349 | 65612 | 1368 | 65664 | 52 | 0.9992080897 |
| 350 | 65800 | 1371 | 65808 | 8 | 0.9998784342 |

TABLE 2

| ENTRY # | Ni |
|---|---|
| 1 | [2, 3, 4, 5, 6, 7, 8, 9, 10, 11, 12, 13] |
| 2 | [18, 36] |
| 3 | [17, 34] |
| 4 | [16, 32, 48] |
| 5 | [15, 30, 45, 60] |
| 6 | [29, 58] |
| 7 | [14, 28, 42, 56, 70, 84] |
| 8 | [41, 82] |
| 9 | [27, 54, 81, 108] |
| 10 | [40, 80, 120] |
| 11 | [53, 106] |
| 12 | [66, 132] |
| 13 | [26, 39, 52, 65, 78, 91, 104, 117, 130, 143, 156, 169] |
| 14 | [90, 180] |
| 15 | [77, 154] |
| 16 | [64, 128, 192] |
| 17 | [51, 102, 153, 204] |
| 18 | [89, 178] |
| 19 | [38, 76, 114, 152, 190, 228] |
| 20 | [101, 202] |
| 21 | [63, 126, 189, 252] |
| 22 | [88, 176, 264] |
| 23 | [113, 226] |
| 24 | [138, 276] |
| 25 | [50, 75, 100, 125, 150, 175, 200, 225, 250, 275, 300, 325] |
| 26 | [162, 324] |
| 27 | [137, 274] |
| 28 | [112, 224, 336] |
| 29 | [87, 174, 261, 348] |
| 30 | [149, 298] |
| 31 | [62, 124, 186, 248, 310] |
| 32 | [161, 322] |
| 33 | [99, 198, 297] |
| 34 | [136, 272] |
| 35 | [173, 346] |
| 36 | [74, 111, 148, 185, 222, 259, 296, 333] |
| 37 | [160, 320] |
| 38 | [123, 246] |
| 39 | [86, 172, 258, 344] |
| 40 | [135, 270] |
| 41 | [184, 233] |
| 42 | [98, 147, 196, 245, 294, 343] |
| 43 | [159, 318] |
| 44 | [110, 220, 330] |
| 45 | [171, 342] |
| 46 | [122, 183, 244, 305] |
| 47 | [134, 268] |
| 48 | [146, 219, 292] |
| 49 | [158, 316] |
| 50 | [170, 255, 340] |
| 51 | [194, 291] |
| 52 | [218, 327] |

What is claimed is:

1. A method of sending multiple streams of digital data, at a single average bit rate, from a transmitting module to respective receiving modules; said method including the steps of:

partitioning all of said digital data streams, within said transmitting module, into frames of at least two different lengths, where the length of each frame in any one data stream equals a respective integer for said one data stream multiplied by a minimum frame length that is the same for all said data streams;

writing each frame into a series of several full and partial cells, such that each full cell holds the same number of said data bits while each partial cell holds fewer data bits and other overhead bits which together equal said same number;

sending said full cells and partial cells of all of said frames, from said transmitting module to said receiving modules at a single cell rate, independent of said different frame lengths; and, limiting said different frame lengths to those where said respective integer for any one particular stream, divided by the number of full and partial cells in each frame of said one particular stream, is a ratio that is the same for all of said streams.

2. A method according to claim 1 and further including the step of generating an output signal, in each receiving module, which has said single average bit rate, by including in the output signal all of said data bits but none of said other bits from said full cells and said partial cells of one of said digital data streams.

3. A method according to claim 1 wherein said partitioning step is performed such that said frame lengths differ from one of said digital data streams to another, but do not differ within any one particular digital data stream.

4. A method according to claim 1 wherein said partitioning step is performed such that said frame lengths differ within one particular digital data stream.

5. A method according to claim 1 wherein said minimum frame length is 188 words of said digital data, and each full cell holds 48 words of said digital data.

6. A method according to claim 5 wherein each respective integer, for all of said data streams, is selected from the integers 2 thru 13.

7. A method according to claim 5 wherein each respective integer, for all of said data streams, is selected from the integers 26, 39, 52, 65, 78, 91, 104, 117, 130, 143, 156, 169.

8. A method according to claim 5 wherein each respective integer, for all of said data streams, is selected from the integers 50, 75, 100, 125, 150, 175, 200, 225, 250, 275, 300, 325.

9. A method according to claim 5 wherein each respective integer, for all of said data streams, is selected from the integers 74, 111, 148, 185, 222, 259, 296, 333.

10. A method according to claim 5 wherein each respective integer, for all of said data streams, is selected from the integers 14, 28, 42, 56, 70, 84.

11. A method according to claim 5 wherein each respective integer, for all of said data streams, is selected from the integers 38, 76, 114 , 152, 190, 228.

12. A method according to claim 5 wherein each respective integer, for all of said data streams, is selected from the integers 98, 147, 196, 245, 294, 343.

13. A method according to claim 5 wherein each respective integer, for all of said data streams, is selected from the integers 62, 124, 186, 248, 310.

14. A method according to claim 5 wherein each word of said digital data is an eight bit word.

15. A method according to claim 5 wherein each word of said digital data is a thirty-two bit word.

16. A method according to claim 1 wherein each digital data stream is a video program.

17. A method according to claim 1 wherein said partitioning step, writing step, sending step, and limiting step are performed by multiple transmitting modules which operate in parallel in response to a signal clock signal.

* * * * *